United States Patent

[11] 3,594,569

| [72] | Inventor | John Webster Cranmore<br>Moseley, Birmingham, England |
|---|---|---|
| [21] | Appl. No. | 769,170 |
| [22] | Filed | Oct. 21, 1968 |
| [45] | Patented | July 20, 1971 |
| [73] | Assignee | Joseph Lucas (Industries) Limited<br>Birmingham, England |
| [32] | Priority | Oct. 27, 1967 |
| [33] |  | Great Britain |
| [31] |  | 48871/67 |

[54] RECTANGULAR ADJUSTABLE HEADLAMP ASSEMBLY FOR ROAD VEHICLES
5 Claims, 3 Drawing Figs.

[52] U.S. Cl. .................................................. 240/44,
240/8.1, 240/41.6, 240/57
[51] Int. Cl. ....................................................... F21v 21/14
[50] Field of Search............................................ 240/8.1,
8.2, 8.22, 8.3, 57, 44, 61.6, 7.1, 61.7, 41.6, 41.35 E

[56] References Cited
UNITED STATES PATENTS
2,235,545  3/1941  Young............................ 240/8.1
2,343,598  3/1944  Wagner......................... 240/8.2
2,826,682  3/1958  Falge............................. 240/57

Primary Examiner—Samuel S. Matthews
Assistant Examiner—T. A. Mauro
Attorney—Holman & Stern ABSTRACT: A headlamp assembly includes a rectangular lamp unit having a pair of flanges which project from opposite sides of the unit respectively. The flanges lie on an imaginary line parallel with the horizontal axis of the lamp unit, and has engaged therewith respective screws. The screws are engaged at one end with the flanges for angular movement relative to the flanges, and are engaged at their opposite ends with respective nuts which are affixed to a support member. The arrangement is such that rotation of one of the screws in a direction to move its respective flange towards the support member while rotating the other screw through the same angular distance but in a direction to move its respective flange away from the support member, so as to adjust the attitude of the lamp unit with respect to the support member about a vertical axis passing through the midpoint of said imaginary line.

PATENTED JUL 20 1971
3,594,569
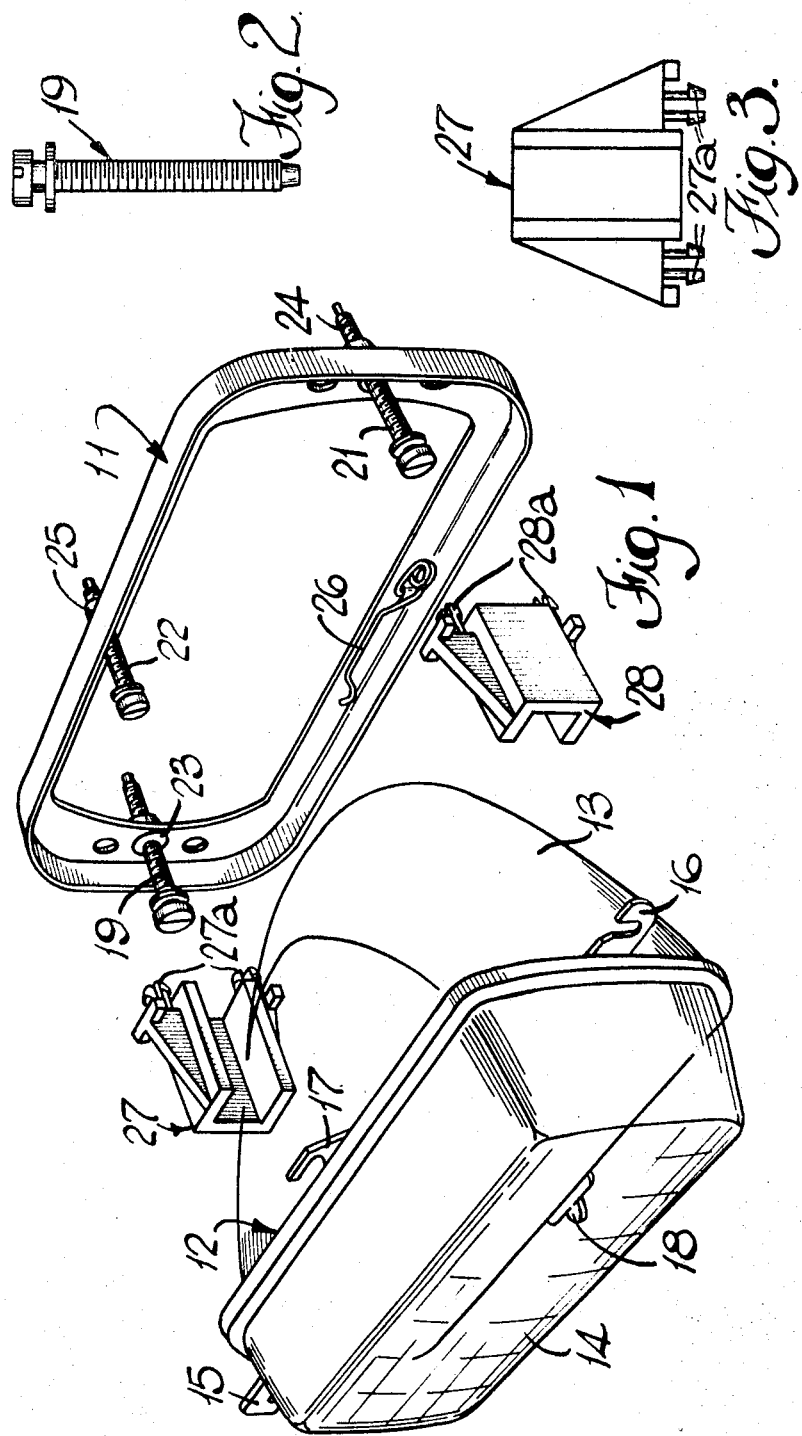
INVENTOR
John Webster Cranmore
BY Glascock, Downing
& Seebold
ATTORNEYS

RECTANGULAR ADJUSTABLE HEADLAMP ASSEMBLY FOR ROAD VEHICLES

This invention relates to headlamp assemblies, for road vehicles.

A headlamp assembly according to the invention includes a rectangular lamp unit having a pair of flanges which project from opposite sides of the unit respectively and which lie on an imaginary line parallel with the horizontal axis of the lamp unit, and a pair of screws engaged at one end with said flanges respectively for angular movement relative thereto, the screws being axially fixed relative to the flanges and being engaged with respective nuts fixed to a support member, the arrangement being such that rotation of one of the screws in a direction to move its respective flange towards the support member while rotating the other screw through the same angular distance but in a direction to move its respective flange away from the support member, serves to adjust the attitude of the lamp unit with respect to the support member about a vertical axis passing through the midpoint of said imaginary line.

One example of the invention is illustrated in the accompanying drawings wherein:

FIG. 1 is an exploded perspective view of a vehicle headlamp assembly,

FIG. 2 is a side view of one of the screws shown in FIG. 1 but to an enlarged scale and, FIG. 3 is a front view of one of the guide parts shown in FIG. 1 but to an enlarged scale.

Referring to the drawings the headlamp assembly comprises a generally rectangular, annular support member 11 which is adapted to be secured to the body of a road vehicle with its longer sides horizontally disposed and its shorter sides vertically disposed, and a generally rectangular lamp unit 12. The lamp unit 12 includes a dished reflector 13 adapted to receive a bulb holder (not shown) and a lens 14 closing the open end of the reflector 13.

Integral with the reflector 13 and extending from opposite shorter sides thereof respectively are a pair of flanges 15, 16 the flanges 15, 16 being positioned at the midpoints of the peripheral edges of the shorter sides of the reflector. A third flange 17 similar to the flanges 15, 16 extends from the midpoint of the peripheral edge of the upper longer side of the reflector and a fourth flange 18, extends from the midpoint of the peripheral edge of the lower longer side.

The flanges 15, 16, 17 are each formed with a slot and engaged with each of the flanges 15, 16, 17 is a respective screw 19, 21, 22. The head of each of the screws 19, 21, 22 is formed with a circumferential groove (FIG. 2) and each screw is engaged with its respective flange 15, 16, 17 by inserting the narrow neck defined in the head of the screw into the slot in the respective flange. Thus the screws 19, 21, 22 are capable of angular but not axial movement with respect to the flanges 15, 16, 17. The shanks of the screws 19, 21, 22 are engaged with respective nuts 23, 24, 25 secured to the support member 11 and the flange 18 of the lamp unit is engaged by one end of a wire spring 26 the other end of which is secured to the support member. Thus the lamp unit 12 is mounted on the support member 11 through the screws 19, 21, 22 and any free play between the screws and their respective flanges is taken up by the spring 26.

Engaged with the support member 11 and associated with the flanges 15, 16 respectively are a pair of moulded guide parts 27, 28. Each guide part 27, 28 comprises a generally channel-shaped portion which is provided with two pairs of resilient barbed catch members 27a, 28a respectively, at one axial end thereof. The guide parts are engaged with the support member 11 by engaging the respective pairs of barbed catch members 27a, 28a as a snap fit in corresponding holes in the support member, the guide parts extending from the support member 11 parallel with the screws 19, 21 and receiving the flanges 15, 16 as a sliding fit.

The screws 19, 21 are substantially identical so that by rotating the screws 19, 21 through the same angular distance but in opposite angular directions one of the flanges 15, 16 will be moved towards the support member while the other flange is moved away from the support member and the position of the lamp unit 12 relative to the support member will be adjusted about a vertical axis passing midway between the screws 19, 21. The position of the lamp unit 12 relative to the support member 11 can be adjusted about a horizontal axis passing through the screws 19, 21 by rotating the screw 22.

The guide parts 27, 28 serve to guide the flanges 15, 16 for movement at right angles to the support member 11 during adjustment of the position of the lamp unit 12 about said vertical axis and further serve to support the lamp unit against vibration relative to the support member 11 in use.

Having thus described my invention what I claim as new and desire to secure by Letters Patent is:

1. A headlamp assembly including a rectangular lamp unit having a pair of flanges which project from opposite sides of the unit respectively and which lie on an imaginary line parallel with the horizontal axis of the lamp unit, a support member, a pair of screws engaged at one end with said flanges respectively for angular movement thereto, the screws being axially fixed relative to the flanges, and being engaged with respective nuts fixed to said support member, and a pair of guides carried by the support member extending outwardly therefrom and coacting with said pair of flanges on opposite sides of the lamp unit, rotation of one of the screws in a direction to move its respective flange towards the support member while rotating the other screw through the same angular distance but in a direction to move its respective flange away from the support member serving to adjust the attitude of the lamp unit with respect to the support member about a vertical axis passing through the midpoint of said imaginary line, and said guide means serving to guide said flanges for movement at right angles to said support member during said adjustment of the attitude of the lamp unit about said vertical axis.

2. An assembly as claimed in claim 1 further including a third flange which projects from the upper edge of the lamp unit and a third screw axially fixed relative to the third flange and being engaged with a respective nut fixed to the support member the arrangement being such that rotation of said third screw relative to said third flange serves to adjust the attitude of the lamp unit relative to the support member about said imaginary line.

3. An assembly as claimed in claim 1 including resilient means acting between the lamp unit and the support member to urge the lamp unit towards the support member.

4. An assembly as claimed in claim 1 wherein said guide members are moulded in synthetic resin material.

5. An assembly as claimed in claim 1 wherein each of said guide members is engaged as a snap fit with the support member.